US011287697B2

(12) United States Patent
Bushnell et al.

(10) Patent No.: US 11,287,697 B2
(45) Date of Patent: Mar. 29, 2022

(54) ELECTRONIC DEVICES HAVING PERIPHERAL DISPLAY REGIONS

(71) Applicant: Apple Inc., Cupertino, CA (US)

(72) Inventors: Tyler S. Bushnell, Mountain View, CA (US); Richard A. Davis, Cupertino, CA (US); Christopher M. Werner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 16/513,270

(22) Filed: Jul. 16, 2019

(65) Prior Publication Data

US 2021/0018799 A1    Jan. 21, 2021

(51) Int. Cl.
| G02F 1/13357 | (2006.01) |
| G06F 1/16 | (2006.01) |
| H04M 1/02 | (2006.01) |
| G02F 1/1333 | (2006.01) |

(52) U.S. Cl.
CPC ........ *G02F 1/133615* (2013.01); *G06F 1/163* (2013.01); *G06F 1/1641* (2013.01); *H04M 1/0268* (2013.01); *G02F 1/133388* (2021.01)

(58) Field of Classification Search
CPC ....... G06F 1/163; G06F 1/1692; G06F 1/1607
See application file for complete search history.

(56) References Cited

U.S. PATENT DOCUMENTS

| 6,700,557 | B1 | 3/2004 | McKnight |
| 9,304,949 | B2 | 4/2016 | Whitman et al. |
| 9,317,155 | B2* | 4/2016 | Magi ................. G06F 3/0482 |
| 10,055,039 | B2 | 8/2018 | Myers et al. |
| 10,146,077 | B2 | 12/2018 | Xia et al. |
| 2009/0069067 | A1* | 3/2009 | Abe ..................... G07F 17/34 463/20 |
| 2011/0018849 | A1 | 1/2011 | Lowe et al. |
| 2011/0090694 | A1 | 4/2011 | Hardacker et al. |
| 2016/0351107 | A1* | 12/2016 | Chen .................... G09G 3/20 |

* cited by examiner

*Primary Examiner* — Lucy P Chien
(74) *Attorney, Agent, or Firm* — Treyz Law Group, P.C.; G. Victor Treyz

(57) ABSTRACT

An electronic device may be provided with a display. The display may be mounted in a housing. Electronic components may be mounted in an interior region of the device. The display may have an array of pixels configured to display an image. A border region such as a ring-shaped border may run along the outermost peripheral edge of the array of pixels. The display may be covered by a transparent display cover layer. The transparent display cover layer may have opposing inner and outer surfaces. The inner surface may face the interior region of the device. A laser-marked light-scattering structure may be embedded within an interior portion of the display cover layer between the inner and outer surfaces. The light-scattering structure may be located in the border region and may be illuminated by a light-emitting device.

20 Claims, 6 Drawing Sheets

ELECTRONIC DEVICES HAVING PERIPHERAL DISPLAY REGIONS

FIELD

This relates generally to electronic devices, and, more particularly, to electronic devices with displays.

BACKGROUND

Electronic devices such as cellular telephones, tablet computers, and other electronic equipment may include displays for presenting images to a user.

If care is not taken, electronic devices with displays may not have a desired appearance or may be difficult to use satisfactorily. For example, it may be difficult to efficiently use displays to present certain visual information to a user.

SUMMARY

An electronic device may be provided with a display. The display may be mounted in a housing. Electronic components may be mounted in an interior region of the device. The display may have an array of pixels configured to display an image. A border region such as a ring-shaped border may run along the outermost peripheral edge of the array of pixels and may be free of image-producing pixels.

In order to provide a user with supplemental visual information in the border region, illuminated visual elements may be provided in the border. These visual elements can be controlled separately from the image displayed using the array of pixels.

The display may be covered by a transparent display cover layer. The transparent display cover layer may have opposing inner and outer surfaces. The inner surface may face the interior region of the device. A laser-marked light-scattering structure associated with a visual element such as an icon or other visual element may be embedded within an interior portion of the display cover layer between the inner and outer surfaces. The central portion of the display cover layer may overlap the pixel array, so that the image on the pixels array may be viewed through the display cover layer. The light-scattering structure may be located in the border region and may be illuminated by a light-emitting device separate from the array of pixels. In some configurations, an opaque coating layer may be located beneath the light-scattering structure to help hide the light-scattering structure from view in the absence of light from the light-emitting device.

DETAILED DESCRIPTION

An electronic device may be provided with a display. The display may have an array of pixels that forms an active area of the display in which an image is displayed. A transparent display cover layer may overlap the array of pixels to protect the pixels from damage. Laser marking techniques or other processing techniques may be used to create light-scattering structures within the display cover layer. For example, a hazy area may be formed along a border region of the display cover layer that runs along the outer peripheral edge of the active area. During operation, the pixels display an image on the display in the active area. When desired to produce visual output using the border region, a light-emitting device may illuminate the light-scattering structures in the border region. The light-emitting device can be operated independently from the pixels in the active area that are displaying the image.

The light-scattering structures in the border region may be patterned to form text (e.g. alphanumeric characters such as number and/or letters), symbols, graphics (e.g., an icon), abstract elements, or any other suitable visual elements. By placing the light-scattering structures in the border region, the visual elements associated with the light-scattering structures do not overlap the pixels in the active area. This allows the visual elements to be displayed at the same time as an image in the active area or to be displayed separately (e.g., when the image is not present because the pixels in the active area are all off).

Figure 1:
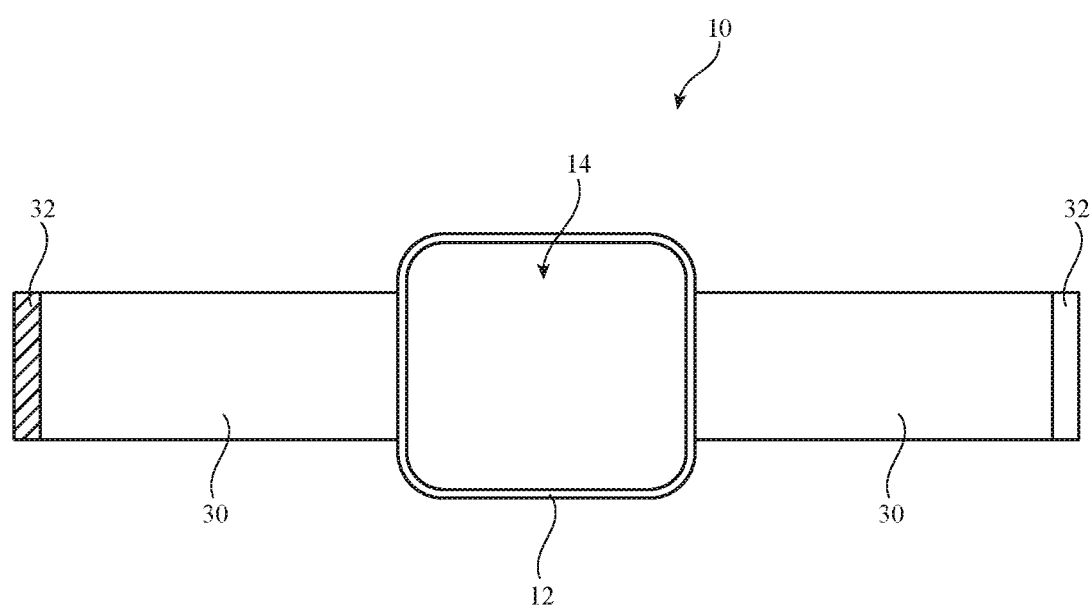
FIG. 1 is a top view of an illustrative electronic device in accordance with an embodiment.
Figure 2:
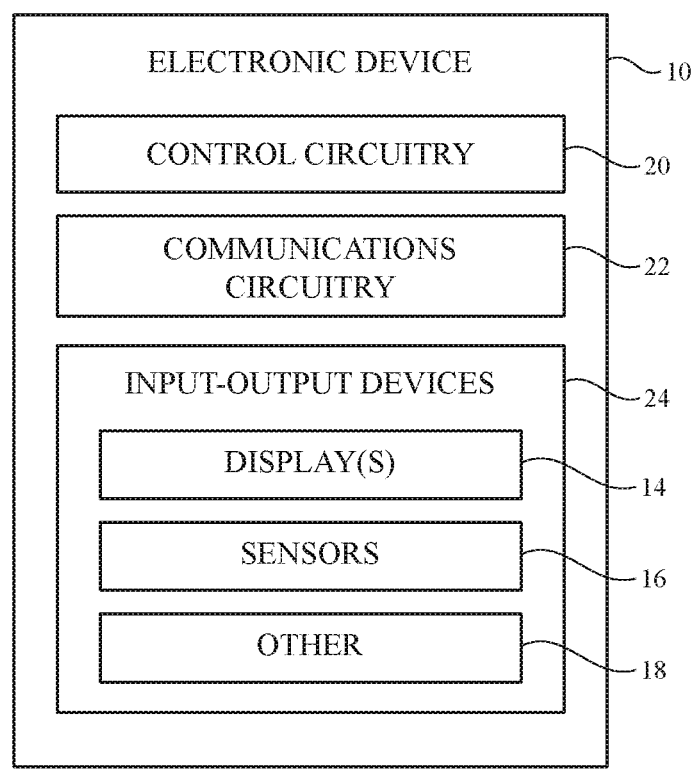
FIG. 2 is a schematic diagram of an illustrative electronic device in accordance with an embodiment.

A top view of an illustrative electronic device with a display is shown in FIG. 1. As shown in FIG. 1, device 10 may have a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Display 14 may have a rectangular outline (e.g., a square outline with rounded corners as shown in FIG. 1), may have a circular outline, or may have other suitable shapes.

If desired, a band (strap) such as band 30 or other external structures may be coupled to housing 12 (e.g., using spring bars, magnets, threaded fasteners, clips, or other coupling structures). Band 30 may be a wristband with a clasp such as clasp 32 that is configured to allow device 10 to be worn by a user. Band 30 may be formed from metal, fabric, natural materials such as leather, polymer, or other materials. Clasp 32 may be a magnetic clasp, a mechanical clasp, or other suitable clasp. Device 10 may be a wristwatch that is worn on a user's wrist or other wearable device. If desired, device 10 may be a cellular telephone, tablet computer, desktop computer, display device, or other suitable equipment including a display. The use of display 14 in a wearable portable device such as a wristwatch device is sometimes described herein as an example.

Display 14 may be a liquid crystal display, an organic light-emitting diode display having an array of thin-film organic light-emitting diode pixels on a flexible substrate, or a display based on other display technologies (e.g., an electrophoretic display, a display having an array of crystalline semiconductor light-emitting diodes on a flexible substrate, etc.). Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Touch sensor structures such as capacitive touch sensor electrodes may be formed as part of a thin-film organic light-emitting diode display panel or other pixel array for display 14 or may be formed using a separate touch sensor panel that overlap a display panel.

Display 14 may include one or more layers of transparent protective material. For example, the outermost layer of display 14, which may sometimes be referred to as a display cover layer, may be formed from a hard transparent material such as glass, rigid polymer, sapphire or other crystalline material, or other clear material to help protect display 14 from damage.

A schematic diagram of electronic device 10 is shown in FIG. 1. Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external equipment, control circuitry 20 may communicate using communications circuitry 22. Circuitry 22 may include antennas, wireless transceiver circuitry such as radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular transceiver circuitry such as cellular telephone transceiver circuitry configured to support voice and/or data communications over a cellular telephone link, or transceiver circuitry configured to support communications over any other suitable wired or wireless communications link). Wireless communications may, for example, be supported over a Bluetooth® link, a WiFi® link, a millimeter wave link, a cellular telephone link handling voice and/or data, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. During operation, control circuitry 20 may use sensors and other input devices in devices 24 to gather input and can control output devices in devices 24 to provide desired output.

Devices 24 may include one or more displays such as display 14. Display 14 may have an array of pixels configured to display images for a user. The display pixels may be formed on a substrate. The substrate may be a flexible substrate (e.g., display 14 may be formed from a flexible display panel) or a rigid substrate. Conductive electrodes for a capacitive touch sensor in display 14 and/or an array of indium tin oxide electrodes or other transparent conductive electrodes overlapping display 14 may be used to form a two-dimensional capacitive touch sensor for display 14 (e.g., display 14 may be a touch sensitive display). If desired, capacitive touch sensor electrodes may be formed from thin-film circuitry on the same substrate as the display pixels. In some configurations, a separate two-dimensional touch sensor layer (e.g., a polymer film or other layer with an array of capacitive touch sensor electrodes) may overlap the array of pixels.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

If desired, electronic device 10 may include additional components (see, e.g., other devices 18 in input-output devices 24). The additional components may include haptic output devices, audio output devices such as speakers, light-emitting devices such as light-emitting diodes or lasers (e.g., thin-film organic light-emitting diodes, crystalline semiconductor light-emitting diodes, semiconductor lasers such as vertical cavity surface emitting laser diodes, other laser diodes formed from crystalline semiconductor dies, etc.), other optical output devices, and/or other circuitry for gathering input and/or providing output. If desired, light-emitting devices may be used that illuminate translucent (hazy) portions of a display cover layer that are configured to form visual elements such as icons, text, abstract patterns, or other structures. Device 10 may also include a battery or other energy storage device, connector ports for supporting wired communication with ancillary equipment and for receiving wired power, and other circuitry.

Figure 3:
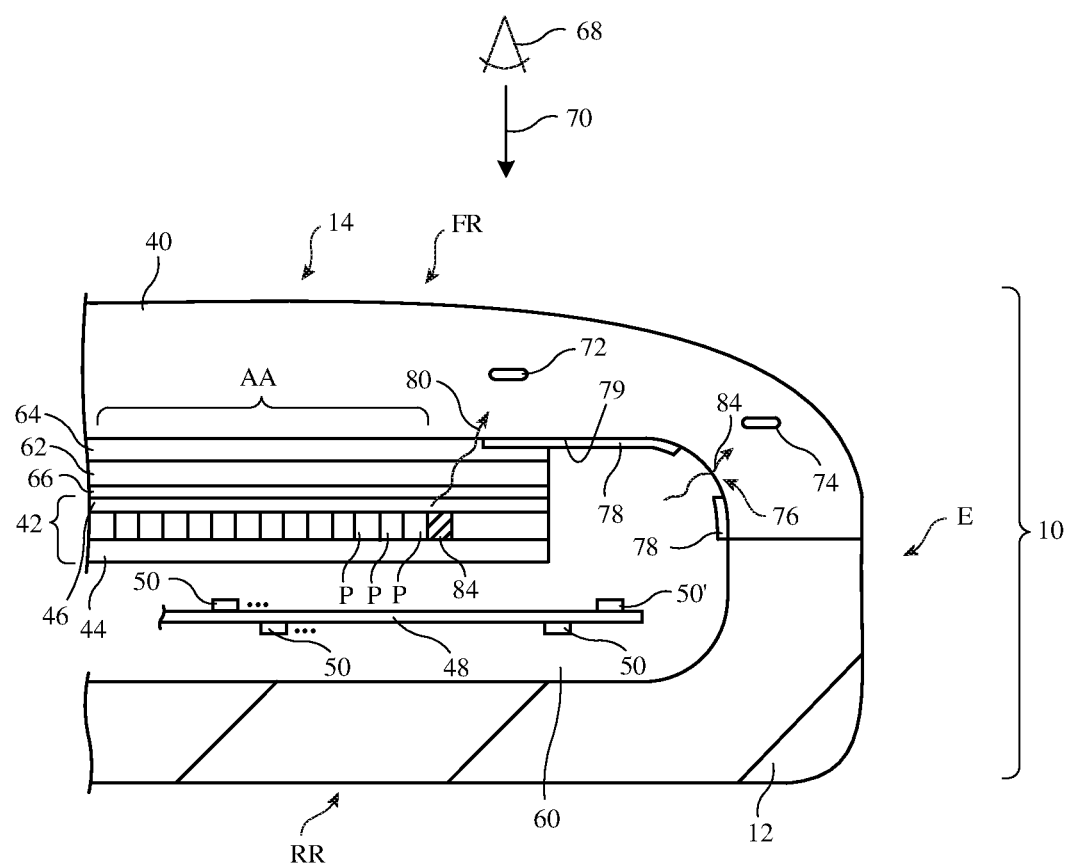
FIG. 3 is a cross-sectional side view of portion of a display and internal components in an illustrative electronic device in accordance with an embodiment.

A cross-sectional side view of an edge portion of an illustrative display and associated internal components in device 10 is shown in FIG. 3. As shown in FIG. 3, device 10 may have housing walls that separate an interior region such as interior 60 from the exterior region surrounding device 10. Device 10 may include electrical components 50 mounted on one or more printed circuits such as printed circuit 48. Components 50 may include integrated circuits and other devices. Components 50 may form control circuitry 20, communications circuitry 22, input-output devices 24 such as sensors 16 and devices 18 (e.g., light-emitting devices such as light-emitting diodes and lasers), and other circuitry. Components 50 may, if desired, include light-emitting components such as light-emitting device 50' on printed circuit 48.

As shown in the illustrative configuration of FIG. 3, display 14 may be formed on front face FR of device 10. Display 14 may include a display layer such as display layer 42. Display layer 42, which may sometimes be referred to as a pixel array or display panel, may have an array of pixels P. Pixels P may be formed from crystalline semiconductor light-emitting diodes, thin-film organic light-emitting diodes, and/or other pixel structures (e.g., liquid crystal display structures). In the illustrative configuration of FIG. 3, pixels P are thin-film organic light-emitting diode pixels that are formed from thin-film circuitry on substrate 44. Substrate 44 may be a flexible substrate (e.g., a flexible polyimide substrate or other flexible polymer layer) or may be a rigid substrate. One or more optical films such as optical layer 46 may be included in display 14. Layer 46 may be, for example, a circular polarizer 46 for suppressing ambient light reflections. In the illustrative configuration of FIG. 3, display 14 includes an optional two-dimensional capacitive touch sensor layer 62. If desired, optically clear adhesive layer 64 may be interposed between layer 62 and display cover layer 40 and optically clear adhesive layer 66 may be interposed between layer 62 and display layer 42.

The housing for device 10 may include rear housing wall structures such as a portion of housing 12 forming a rear housing wall on rear face RR of device 10. The housing for device 10 may also include side housing wall structures such as a portion of housing 12 on side E of device 10 and may include structures that form display cover layers such as display cover layer 40 on front face FR of device 10. Portions of display cover layer 40 may, if desired, extend over part or all of edge E and/or may wrap to the rear of device 10 (as examples). Display cover layer 40 (which may sometimes be referred to as a transparent housing wall or transparent housing structure) overlaps an array of pixels P forming an active area AA for display 14. When it is desired to provide a user such as viewer 68 who is viewing device 10 in direction 70 with visual content, control circuitry 20 may display an image in active area AA of display 14 using pixels P.

An inactive display area is formed along the peripheral border of active area AA. This border region may contain display driver circuitry and encapsulation structures, but does not contain pixels P for displaying the active area image. The image displayed in active area AA therefore does not extend into the border region that runs along the outermost edge of active area AA.

Supplemental visual information may be provided to viewer 68 using illuminated visual elements in the display border region. These visual elements may be formed by one or more light-scattering structures in display cover layer 40. Display cover layer may have an exterior surface that faces the exterior of device 10 and an opposing inner surface that faces interior 60. The light-scattering structures may be formed in an interior portion of display cover layer 40 (e.g., a region that is between the outwardly facing and inwardly facing surfaces of display cover layer 40).

In the example of FIG. 3, display cover layer 40 has illustrative light-scattering structures 72 and light-scattering structures 74 embedded in display cover layer 40. These light-scattering structures may be formed by laser marking techniques (sometimes referred to as laser internal engraving) or other fabrication techniques. With an illustrative arrangement, picosecond pulses of ultraviolet laser light are focused within the interior of display cover layer 40, thereby locally damaging the glass or other material forming display cover layer 40 and creating light-scattering structures that scatter light that is incident on these structures. The laser may be scanned and/or the focus of the laser can be adjusted during laser marking operations, so that desired visual elements can be created from the light-scattering structures in the interior of display cover layer 40. The outer and inner surfaces of display cover layer 40 can remain undamaged and smooth.

When illuminated, the light-scattering structures in an interior portion of the display cover layer scatter light and thereby light up for viewing by the user. As a result, the visual elements formed from the light-scattering structures become visible to the user in the border region. In the absence of the light-scattering structures, illumination would pass through this interior portion of the display cover layer without being scattered and no visual elements would be visible.

Examples of visual elements that can be created include text (e.g., a person's name, a descriptive label, a trade name, instructions, numbers, alphanumeric strings of letters and/or numbers, text symbols, and/or other alphanumeric character strings), graphics (e.g., icons such as trademarks, descriptive icons that serve as status indicator icons such as a battery charge state icon, a power on/off icon, a silent-mode icon, a mute icon, a wireless signal strength icon, etc., and/or other graphical elements), and abstract elements such as continuous and discontinuous lines, line segments, rectangular blocks, and/or other abstract shapes.

Portions of display cover layer 40 and/or other structures in device 10 can be provided with opaque masking materials. The opaque masking materials may include black polymer (e.g., polymer containing black pigment and/or dye) and/or other opaque polymer. In an illustrative configuration, a layer of opaque material such as black ink or other opaque coating 78 may be formed on a portion of inner surface 79 of display cover layer 40 in the border region of display 14. This opaque material may help hide internal components in interior 60 from view by viewer 68. In scenarios in which light-scattering structures such as illustrative structures 72 and/or 74 visually overlap opaque coating 78, the presence of opaque border structures such as coating 78 may make it difficult or impossible to view structures 72 and/or 74 in the absence of illumination from a light-emitting device. This makes the visual elements associated with structures 72 and/or 74 invisible to the naked eye when light-emitting devices are not producing illumination for structures 72 and/or 74. Accordingly, control circuitry 20 can make visual elements associated with light-scatting structures such as structures 72 and/or 74 in the display border either visible or invisible by turning on or off corresponding light-emitting devices.

As shown in FIG. 3, for example, light-emitting device 84 may produce light 80 to illuminate light-scattering structure 72 and/or light-emitting device 50' may produce light 82 to illuminate light-scattering structure 74. Light-emitting devices such as light-emitting device 84 and/or light-emitting device 50' may produce white light or light with a non-neutral color (e.g., red light, blue light, green light, etc.). The light produced may be steady (e.g., a fixed intensity) and/or variable (e.g., pulsed or otherwise changing in intensity). If desired, light-emitting device 84 may be adjustable and may emit light of different intensities and/or colors under control of control signals from control circuitry 20. Light-emitting device 84 may be formed on the same substrate as pixels P or on a different substrate. When one or more light-emitting devices such as light-emitting device 84 are formed on a common substrate with pixels P such as substrate 44, signal lines formed from thin-film metal traces in the thin-film circuitry on substrate 44 may be used in providing control signals to light-emitting device 84. Light-emitting device 50' may be mounted on printed circuit 48 and may be provided with control signals using metal traces on printed circuit 48.

When it is desired to view a visual element associated with a light-scattering structure embedded in layer 40 in the border region of display 14, the corresponding light-emitting device in device 10 may be used to generate illumination for that light-scattering structure. In the example of FIG. 3, light 82 passes through opening 76 in coating 78. Light 80 may pass through an opening in coating 78 or may, as shown in FIG. 3, pass to light-scatting structure 74 along the inner edge of coating 78. If desired, structures in display layer 42 may help direct light 80 away from active area AA, so that light 80 does not visually encroach on the image displayed in active area AA.

When it is desired to illuminate light-scattering structures 72 and thereby make a visual element associated with light-scattering structures 72 visible to viewer 68, control circuitry 20 can turn on light-emitting device 84 (e.g., a light-emitting diode or laser) to produce light 80. Light 80 may illuminate light-scattering structure 72 so that viewer 68 may view the visual element formed from light-scatting structure 72. When it is desired to hide this light-scatting element from view, light-emitting device 84 may be turned off. Because coating 78 is located behind light-scattering structure 72 when light-scattering structure is being viewed in direction 70 by viewer 68, the visual element formed from light-scattering structure 72 may be invisible to viewer 68 in the absence of light 80. When it is desired to illuminate light-scattering structures 74, device 50' may be turned on to produce light 82. Light-scattering structures 74 may be hidden from view by turning off device 50'.

Any suitable mounting arrangement may be used for the light-emitting devices that produce illumination for light-scattering structures in display cover layer 40. In the example of FIG. 3, light-emitting device 50' is mounted on printed circuit 48 and is located in the border region of display 14 (e.g., light-emitting device 50' is not overlapped by active area AA). If desired, light-emitting device 50' may be formed under active area AA (e.g., behind active area AA when viewed in direction 70). In this type of arrangement, light-emitting device 50' may be located near to the edge of device 10 so that light 82 from light-emitting device 50' passes through opening 76 in coating 78 and illuminates light-scattering structure 74.

Figure 4:
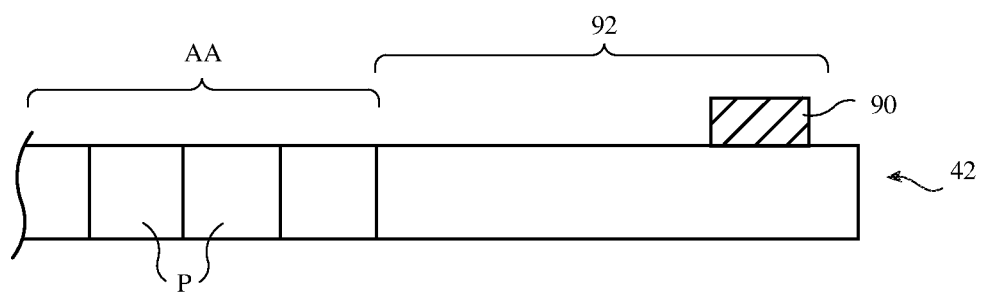
FIGS. 4 and 5 are cross-sectional side views of illustrative edge portions of a display layer for an electronic device in accordance with an embodiment.

If desired, a light-emitting device may be mounted on top of a display layer. As shown in FIG. 4, for example, display layer 42 may include an array of pixels P configured to display an image. No pixels P for displaying the image are present in inactive border region 92. Pixels P may be thin-film organic light-emitting diode pixels or other pixels. If desired, light-emitting device 90 (e.g., a light-emitting diode die, a laser diode die, or other light-emitting component) may be mounted (e.g., using solder, conductive adhesive, etc.) to layer 42 (e.g., to metal traces or other conductive signal paths in layer 42). With this type of arrangement, thin-film circuitry (e.g., interconnect paths formed form metal traces in border region 92 of display layer 42) may be used to help route signals to light-emitting device 90. During operation, light-emitting device 90 may provide light that illuminates a light-scattering structure in display cover layer 40 (e.g., through an opaque coating opening such as opening 76 of FIG. 3).

Figure 5:
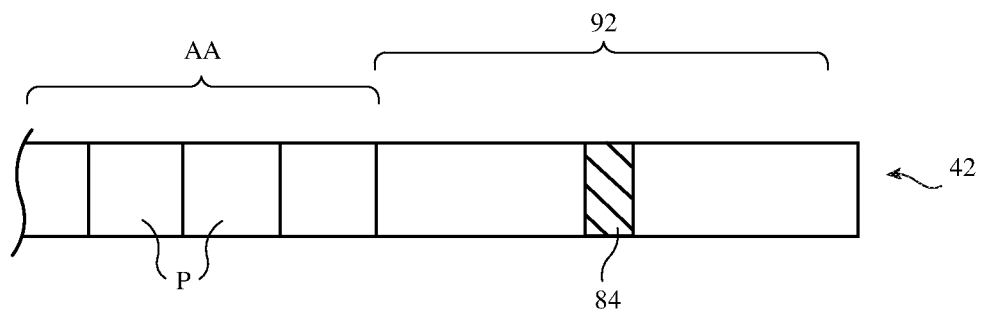

FIG. 5 is a cross-sectional side view of display layer 42 in an illustrative configuration in which light-emitting device 84 is formed from a portion of display layer 42. For example, pixels P of display layer 42 of FIG. 5 may be light-emitting diode pixels such as thin-film organic light-emitting diode pixels or pixels with light-emitting diodes formed from crystalline semiconductor dies. Light-emitting device 84 may be formed from a light-emitting structure of the same type as pixels P, but may be located in border region 92. For example, if pixels P are formed from organic light-emitting diodes, light-emitting device 84 may be formed from an organic light-emitting diode and may be controlled using thin-film circuitry on display layer 42. If pixels P are formed from crystalline semiconductor dies, light-emitting device 84 may also be formed from a crystalline semiconductor die (as an example). As shown in FIG. 5, device 84 may be separated from the outermost edge of pixels P in active area AA by a gap (e.g., a gap of at least two or more pixels in width or other suitable width).

Figure 6:
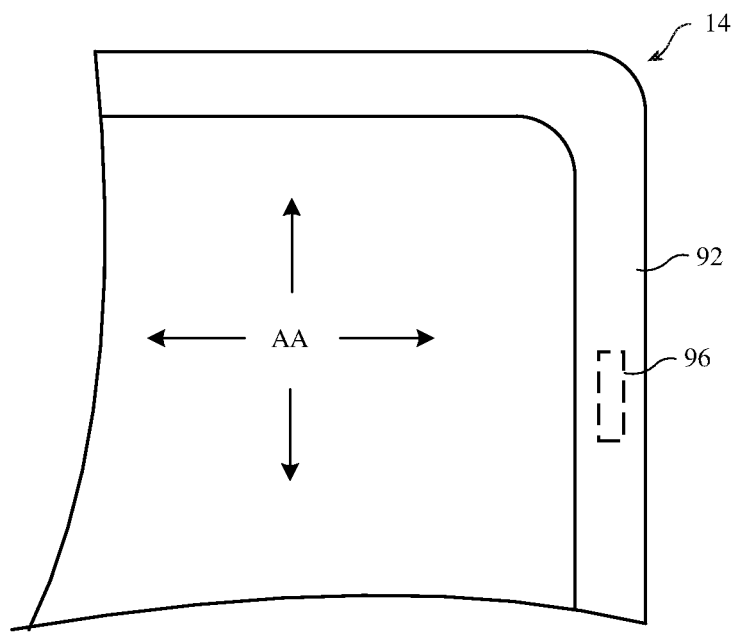
FIGS. 6, 7, and 8 are plan views of portions of illustrative electronic devices in accordance with embodiments.
Figure 7:
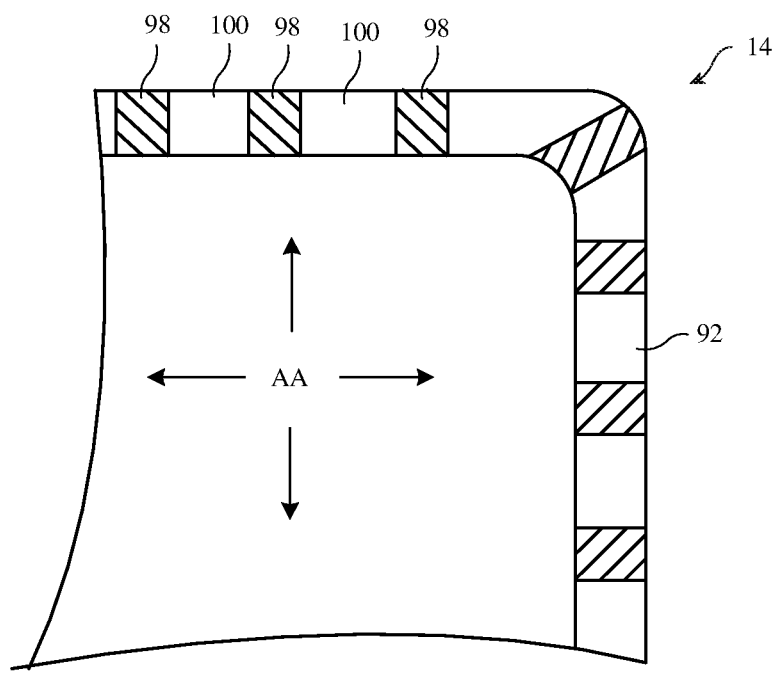

Light-scattering structures may be illuminated along some or all of border 92. Border 92 may extend along one or more edges of display 14. Border 92 may, for example, have four segments running along four respective peripheral edges of device 10 (e.g., border 92 may form a rectangular ring about active area AA). In the example of FIG. 6, light-scattering structure 96 is formed in a middle portion of a segment of border 92 that runs along one of the edges of device 10 (e.g., the right-hand edge, lower edge, etc.). Light-scattering structure 62 may form text, graphics (e.g., status indicator icons, logos, trademarks, tradenames, symbols, etc.), abstract patterns (e.g., squares, circles, lines, wavy lines, and/or other abstract shapes), and/or other suitable visible elements. In the example of FIG. 7, light-scattering structures 98 run along multiple edges (or the entire periphery of device 10) and are separated by respective areas 100 that are free of light-scattering structures 98. Each of light-scattering structures 98 may, if desired, be illuminated by a separate individually controlled light-emitting device (e.g., to implement chasing light effects, flashing lights, etc.). Light-scattering structures 98 may be abstract shapes, text, graphics, or other suitable content.

Figure 8:
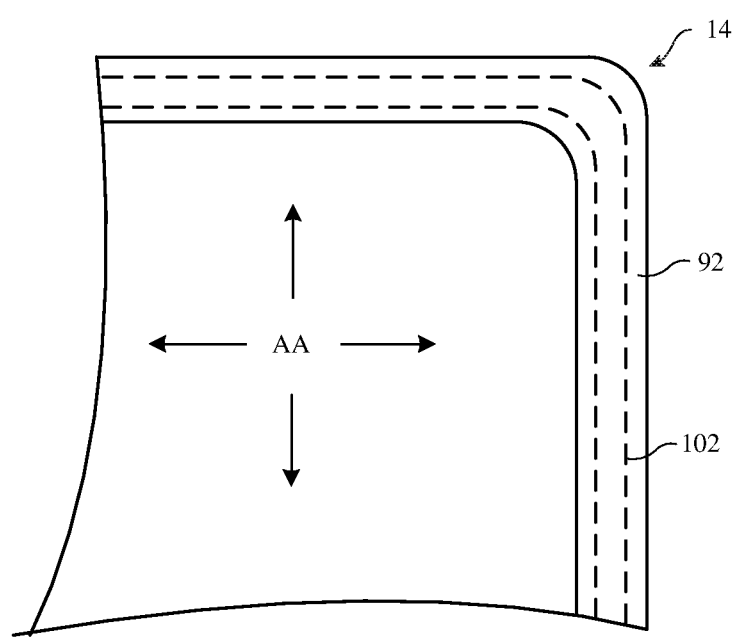

FIG. 8 shows how a light-scattering structure (structure 102) may, if desired, run along the entire periphery of device 10 (e.g., border 92 may form a ring around active area AA). Light-scattering structure 102 may be illuminated by one or more light-emitting devices.

In some configurations, light-scattering structures form visual elements that are illuminated to provide labeling (e.g., text labeling, trademark labeling, brand name labeling, etc.). In other configurations, visual elements formed from light-scattering structures may form an abstract shape and can be illuminated to serve as a visual notification (e.g., by flashing or illuminating with a particular color) and/or decorative trim.

Visual elements may be illuminated in coordination with content in active area AA. As an example, an image in active area AA may contain a visual item that moves from the center of active area AA to a location where the visual item contacts the outer edge of active area AA. When the visual item contacts this edge, a ring-shaped border surrounding active area AA may be illuminated to serve as visual feedback (e.g., a light-scattering structure such as structure 102 of FIG. 8 may be illuminated whenever a moving visual item touches the outer edge of active area AA).

Visual elements formed from light-scattering structures may be illuminated in response to changes in device operating conditions. For example, the illumination for a light-scattering structure may be adjusted in response to expiration of a timer, determination that a sensor reading has exceeded a predetermined threshold, receipt of user input, receipt of a wireless message or incoming telephone call, determination that a particular geographic location has been reached by device 10, and/or in response to satisfaction of criteria associated with one or more other operating conditions. Criteria for illuminating visual elements may be provided to device 10 during manufacturing and/or may be user-defined settings. In some arrangements, visual elements may be illuminated to provide a user with assistance in using device 10. For example, if device 10 is waiting for a user to supply input with a button, a visual element such as text stating "press the button to start" or a flashing green icon may be displayed by using a light-emitting device to supply illumination to a light-scattering structure. In general, visual elements in border 92 may be used for any suitable function (e.g., to supply visual feedback, decoration, a notification, instructions, labeling, etc.).

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
   an array of pixels having an outermost edge surrounded by a border region;
   a display cover layer having a first portion that overlaps the array of pixels and a second portion that overlaps the border region, wherein the display cover layer includes a light-scattering structure that is embedded within the second portion of the display cover layer; and
   a light-emitting device that is adjacent to the array of pixels and that is configured to produce light that illuminates the light-scattering structure.

2. The electronic device defined in claim 1 wherein the display cover layer has opposing inner and outer surfaces, the electronic device further comprising an opaque coating on the inner surface of the second portion of the display cover layer.

3. The electronic device defined in claim 2 wherein the opaque coating has an opening and wherein the light that illuminates the light-scattering structure passes through the opening.

4. The electronic device defined in claim 1 wherein the light-scattering structure is configured to form a visual element selected from the group consisting of: an alphanumeric character and an icon.

5. The electronic device defined in claim 1 wherein the light-scattering structure is configured to form an abstract pattern.

6. The electronic device defined in claim 1 further comprising control circuitry, wherein the control circuitry is configured to display content on the array of pixels in coordination with controlling the light-emitting device.

7. The electronic device defined in claim 1 further comprising control circuitry, wherein the control circuitry is configured to turn on the light-emitting device to produce a visual notification.

8. The electronic device defined in claim 1 further comprising:
   a housing wall coupled to the display cover layer;
   a wristband coupled to the housing wall; and
   wireless transceiver circuitry configured to transmit and receive wireless signals.

9. The electronic device defined in claim 8 wherein the array of pixels forms a rectangular active area configured to display an image and wherein the border region forms a rectangular ring surrounding the array of pixels that does not contain any of the pixels.

10. The electronic device defined in claim 9 wherein the light-emitting device comprises a light-emitting diode, wherein the border region has four segments running along four respective peripheral edges of the rectangular active area, and wherein the light-scattering structure includes portions in each of the four segments.

11. The electronic device defined in claim 1 wherein the array of pixels comprises an array of thin-film organic light-emitting diodes.

12. The electronic device defined in claim 11 wherein the light-emitting device comprises a crystalline semiconductor die.

13. The electronic device defined in claim 11 wherein the light-emitting device comprises a light-emitting device selected from the group consisting of: a light-emitting diode and a laser diode.

14. The electronic device defined in claim 1 wherein the light-emitting device comprises a crystalline semiconductor die.

15. The electronic device defined in claim 14 wherein the pixels comprise organic light-emitting diode display pixels in a display layer and wherein the crystalline semiconductor die is mounted on the display layer.

16. A wristwatch, comprising:
   a housing;
   a wristband coupled to the housing;
   organic light-emitting diode pixels configured to display an image in an active area;
   a display cover layer coupled to the housing, wherein the display cover overlaps the pixels, wherein the display cover layer has opposing inner and outer surfaces, and wherein a light-scattering structure is embedded within the display cover layer between the inner and outer surfaces; and
   a light-emitting device configured to illuminate the light-scattering structure.

17. The wristwatch defined in claim 16 wherein the light-scattering structure comprises a laser-marked interior portion of the display cover layer and wherein the light-emitting device comprises a light-emitting diode configured to emit light that is scattered by the laser-marked interior portion.

18. An electronic device, comprising:
a housing;
a display cover layer coupled to the housing, wherein the display cover layer comprises an embedded laser-marked light-scattering structure;
an array of pixels configured to display an image, wherein the display cover layer has a first portion that overlaps the array of pixels and a second portion that forms a ring-shaped border region that surrounds an outermost peripheral edge of the array of pixels and wherein the embedded laser-marked light-scattering structure is in the ring-shaped border region; and
a light-emitting device configured to produce light that illuminates the laser-marked light-scattering structure.

19. The electronic device defined in claim 18 wherein the laser-marked light-scattering structure is configured to form a visual element selected from the group consisting of: alphanumeric text and an icon.

20. The electronic device defined in claim 18 wherein the light-emitting device is one of the pixels in the array of pixels.

\* \* \* \* \*